Figure 4:
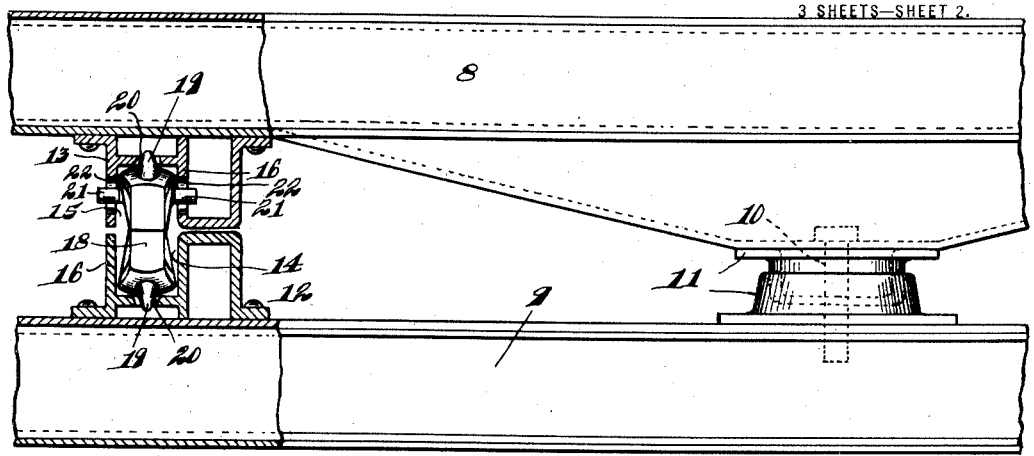

E. A. LAUGHLIN.
VEHICLE BODY BEARING.
APPLICATION FILED NOV. 27, 1916.
1,396,687. Patented Nov. 8, 1921.
3 SHEETS—SHEET 1.
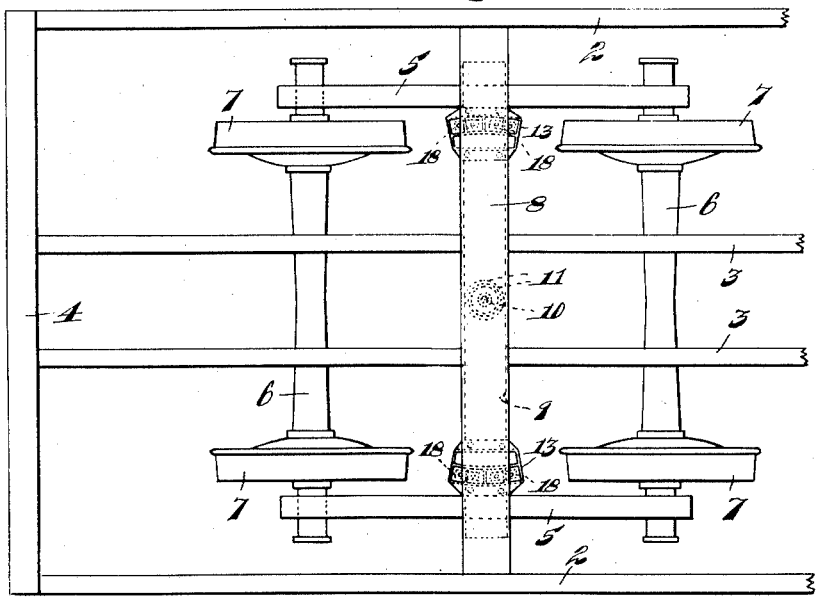
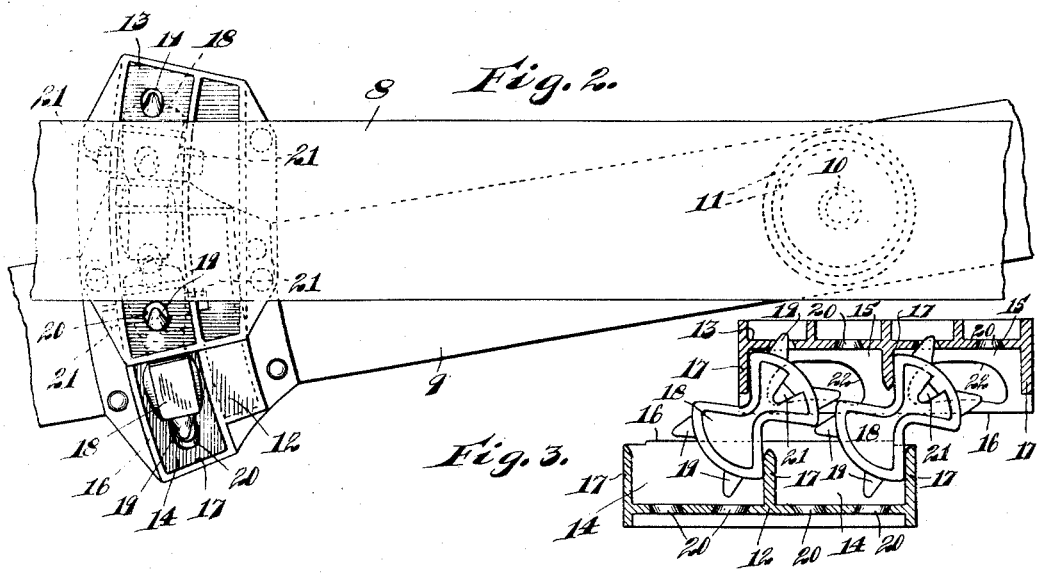
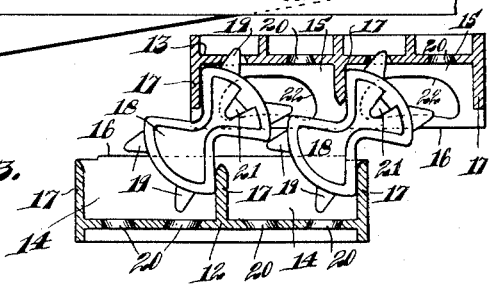

E. A. LAUGHLIN.
VEHICLE BODY BEARING.
APPLICATION FILED NOV. 27, 1916.

1,396,687. Patented Nov. 8, 1921.
3 SHEETS—SHEET 2.

Witnesses:
C. E. Wessels
A. A. Olson

Inventor:
Elmyr A Laughlin
By Joshua H. Potts
his Attorney.

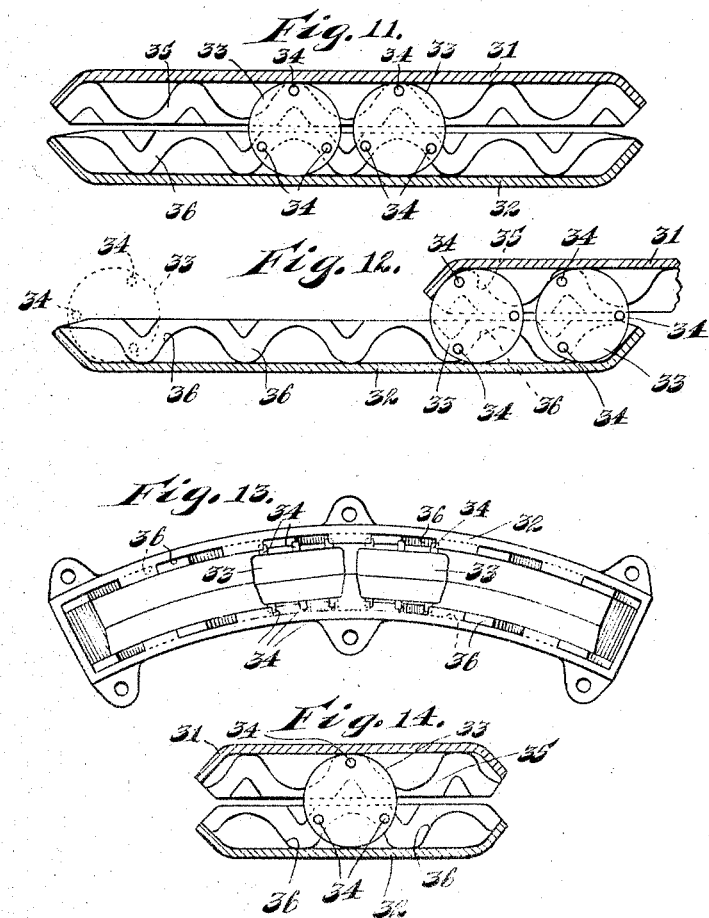

UNITED STATES PATENT OFFICE.

ELMYR A. LAUGHLIN, OF OREGON, ILLINOIS.

VEHICLE-BODY BEARING.

1,396,687.  Specification of Letters Patent.  Patented Nov. 8, 1921.

Application filed November 27, 1916. Serial No. 133,759.

*To all whom it may concern:*

Be it known that I, ELMYR A. LAUGHLIN, a citizen of the United States, and a resident of the city of Oregon, county of Ogle, and State of Illinois, have invented certain new and useful Improvements in Vehicle-Body Bearings, of which the following is a specification.

My invention relates to bearing devices, particularly adapted for use as side bearing plates or center bearing plates for railway cars, though it is to be understood that the invention may be applied to any vehicle which requires the swiveling of the running gears with reference to the vehicle body. The invention is also adapted for use in other relations where a turntable construction is desired.

One of the objects of my invention is to provide a roller-bearing member in which the rollers or rockers will always be centered or brought back to normal load-bearing position when the truck or running-gear is straightened out with reference to the vehicle body.

A further and very important object of the invention is to cause this centering means to retain the rollers in position beneath the point of application of the load when the car or vehicle tips from side to side when the rollers may be freed from the lower runway under which condition the rollers, if entirely free to travel along the runway, would tend to roll to the lowest portion of the lower bearing member, and thus get out from under the central part of application of the load. Means are also provided to sustain or suspend the rollers in the proper position when the car tips, so that when the rollers return to the lower bearing runway, they will seat at a point substantially centered beneath the application of the load.

A further object of the invention is to provide bearing members which may be in the form of rocking members or not complete rollers, said rocking members, so far as their limited travel is concerned, will always be centered beneath the load, and moreover means are provided whereby such rocking members can never tip so far that they will fall out of position to receive the load upon their rounded faces. In other words, the rockers will at all times be so held in position that, when the car after tipping returns to normal position, the rollers will engage the runways directly on their circular curved faces. Moreover, the rollers may be provided with single lugs, or a plurality of lugs which coöperate with the guideways on the bearing housings which at all times compel their return to centered position under the load, while at the same time, these guideways do not in the least interfere with the proper rolling or rocking of the roller members; that is to say, the lugs of the rollers will be practically free of the guideways when the rollers are traveling normally along their runways. It is to be understood, however, that these guide lugs or portions may be a part of or mounted on the housings, and the rollers be provided with guide slots coöperating therewith. This is a mere alternative construction within the broad scope of the invention.

With these and other objects in view, the invention consists in the constructions and arrangements of parts, preferred embodiments of which are illustrated in the accompanying drawings, in which:

Figure 1 is a plan view of the end of a car body showing the truck beneath and including the improvements constituting this invention.

Figure 8:
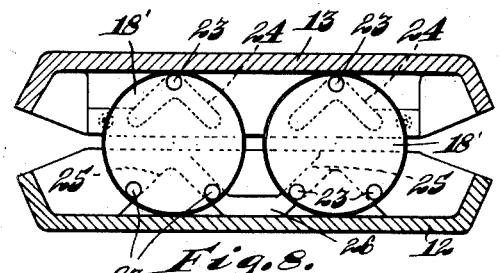
Figure 9:
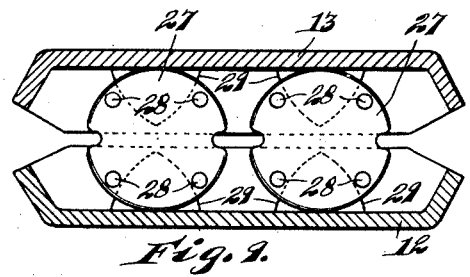
Figure 10:
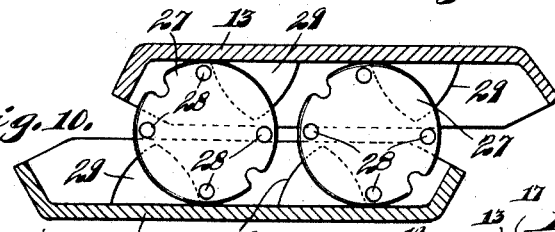
Figure 5:
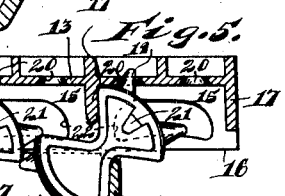
Figures 6, 7:
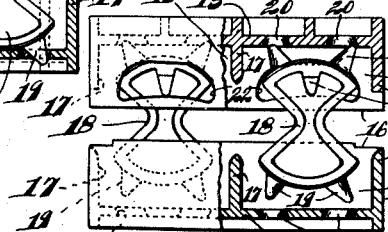

Fig. 2 is a fragmentary plan view of the bearing showing the relative arrangement of the parts when the truck has rotated a considerable distance with respect to the car, Fig. 3 is a section taken longitudinally through the bearing housings showing the relative position of the parts when the truck has rotated a considerable distance with respect to the car, and when the latter has tilted so as to raise the upper bearing housing, Fig. 4 is a sectional transverse view showing the bearing relation to an ordinary center plate of the car, Fig. 5 is a view similar to Fig. 3, showing the relation of the parts the same as in Fig. 3, with the upper bearing housing in lowered or normal position, Figs. 6 and 7 are views similar to Figs. 3 and 5, respectively, showing the relation of the parts with the truck in central or straight-ahead position, Fig. 8 illustrates a modification,
Figs. 9 and 10 illustrate a further modification,
Figs. 11, 12 and 13 illustrate a still further modification, and
Fig. 14 illustrates a modified form of Fig. 11.

In the embodiment of the invention herein selected for illustration and referring particularly to Figs. 1 and 2, the car side sills are represented by reference characters 2—2, the center sills by 3—3, one end sill by 4. 5 indicates the truck side frames, 6 the axles and 7 the wheels of a car truck. The car frame may be provided with a body bolster 8 and beneath this, in the usual manner may be provided a truck bolster 9. The truck bolster is secured to the body of the car by a king pin 10 and center bearing plates 11, which may be of very simple construction and merely intended to receive end or buffing and lateral thrusts on the car truck. It is not necessary that the center bearing plates be provided with any particular antifriction means, such as rolls, bearing balls and the like, since in my improved construction the center bearing plate need not receive any part of the load. It is only required to prevent the truck from being laterally thrust from under the car body. The side bearings illustrated in these two figures comprise a lower housing 12 secured to the truck bolster, and an upper housing 13 secured to the car body, or to body bolster 8. Since the load of the car or vehicle is to be borne practically entirely by the side bearings, the truck bolster need only be of a light construction which connects the center bearing with the side bearings. Within the housings 12 and 13 are provided runways 14 and 15 respectively, there being two of said runways provided in each of said housings in the form shown in said figures.

Referring now to Figs. 3 to 7 inclusive, each of the runways 14 and 15 is provided with side walls 16 and end walls 17 which may be inclined outwardly from the ends of the runway, as shown in Figs. 8, 9 and 10. Each runway or housing may be of the length required to meet the curved conditions of the track or roadway on which the vehicle operates. In these runways are mounted rockers or rollers 18, which bear upon the horizontal adjacent surfaces of said runways, said rockers or rollers being adapted to oscillate or roll in order to permit of relative movement of housings 12 and 13.

In the particular forms shown in Figs. 2 to 7 inclusive, the rockers or rollers 18 are provided, at their ends or bearing faces, with outwardly or radially projecting pointed or substantially conically formed lugs 19 which are adapted for engagement with recesses 20 provided in the bearing faces of guideways 14 and 15. At opposite sides of each rocker or roller are provided laterally projecting lugs 21 which loosely engage in openings 22 formed in the side walls 16 of the upper runways 15. The arrangement is such that the lugs 21 do not necessarily contact with the sides of openings 22, during normal travel of the rockers or rollers in the housings, but when the car body tilts the upper housing 13 will rise away from the lower housing 12 and if the tilt is sufficient, the lugs 21 will engage with the lower edges of said openings, as clearly shown in Figs. 3 and 7, causing suspension of the rockers or rollers immediately under the point of application of the load. The lugs 19 engaging with the openings 20 serve to hold the rockers or rollers so as to prevent shifting of the bearing surfaces thereof relative to the bearing surfaces of the runways. The entire arrangement is such, therefore, as will be seen, that in the normal turning of the car truck, the rockers or rollers 18 will be positively held against relative displacement, the true rolling relation of said rockers or rollers with reference to the runways being maintained under all conditions. In the event of lifting of one side of the car so as to effect elevation of the upper housing when the truck is turned, as shown in Fig. 3, the end walls 17 of the lower runways serve to positively guide the lower lugs 19 into engagement with the lower slots or openings 20, when the car body settles to its normal position causing lowering of the rockers or rollers to the position shown in Fig. 5.

In the modification shown in Fig. 8 true rollers 18' are employed in the place of rockers, as shown in the form above described, that is in the form shown in Fig. 8 the curved peripheries of the members 18' are continuous, completing an entire circle, as distinguished from the members 18 of the form first described wherein the sides of said members are notched or cut away so that the peripheries of said members are interrupted at opposite sides of said members. In the form shown in Fig. 8 also, the rollers 18' are each provided on each side with three lugs 23. The upper lugs 23 engage with V-shaped slots or guideways 24 which are provided in the opposite walls 16 of the upper housing, the lower two lugs 23 engaging in guideways 25 which are provided in the opposite walls 16 of the lower housing, the guideways 25 being of V-shape and arranged with their arms in parallelism with the V-shaped guideways of the upper housing. The arrangement is such that, in the swiveling of the vehicle truck the lugs 23 will travel in the guideways 24 and 25 as the rollers 18' rotate to permit of this swiveling. The guideways 24 serve the function of the slots 22 in the form first described, the lowermost lugs 23 coöperating with the guideways 25 serving the same function as the lugs 19 coöperating with the openings 20, and the end walls 17 coöperating with the lower ends of rockers 18, before described, the result being that said rollers 18' will be maintained at all times in proper relation with respect to the housings, so that when the truck straightens out and the car body lowers after the truck has been turned and the car body lifted, the rollers will be retained in central position in the runways and thus will receive the load centrally and be ready for the swiveling of the truck again in either direction. The V-shaped guideways 25 are connected by a horizontal section 26, which section 26 is adapted also for engagement with the lugs 23.

In Figs. 9 and 10, each of the rockers 27 is provided with four guiding or centering lugs 28, and housings 13 and 14 are each provided with inwardly extending projections 29 which, when the housings are separated by the tilting of the car, coöperate with the guide lugs 28 to maintain the rockers in centered position.

In Figs. 11, 12 and 13 are shown bearing members of much greater extent than the bearing members hereinbefore described. In this form the upper housing 31 and the lower housing 32 are of a considerable arc of a circle, whereas the rollers 33 are, as shown in Fig. 11, always centered with reference to the load and are kept together or constantly spaced apart by guide lugs 34 on the rollers which coöperate with guide passages 35 in the upper housing and guide passages 36 in the lower housing. These guide passages or slots may be in the wall of the housing or otherwise provided, but they are so arranged that the rollers may complete several revolutions in the complete travel from one end of the housing 31 or 32 to the other end thereof. In fact, since the guide lugs and guide slots do not in any way limit the travel of the rollers, it is obvious that these housings might be in the form of a complete circle if conditions of use of the bearing demanded such a construction. It is understood that the main function of the invention is to maintain rollers at all times properly centered beneath the load, or in true rolling relation with respect to the bearing surfaces, at the same time to permit the freest rotation of the rollers or rockers, and also to return the rollers or rockers to proper centered position beneath the load when the tilted car body returns to normal level position.

In Fig. 14, I have illustrated a modification wherein a single roller bearing member is employed, and the parts are represented by the same numerals as in Figs. 11, 12 and 13.

I have used the words "rollers" and "rockers" interchangeably as it is apparent that the roller will perform the function of a rocker where there is not sufficient movement of the bearing-plates or housings to cause a complete rotation of the roller. While, on the other hand, if there is a sufficient movement of the bearing-plates, a complete revolution of the roller may take place, as in Figs. 11 and 12. Furthermore, the word "rotatable" as used in the claims is not intended necessarily to mean that the rollers make a complete revolution, but is intended to include such a rocking motion as may be necessary to perform the required function. Moreover, it is to be understood that while I have described particular embodiments of my invention, the invention is not limited to the construction and arrangement of parts here shown, but such an arrangement of parts may be varied extensively within the scope of the appended claims.

What I claim is:

1. A bearing device comprising upper and lower housings or bearing-plates vertically movable the one with relation to the other and having plain bearing faces, a plurality of rollers interposed between said plates and means on said plates and said rollers to maintain the rollers constantly spaced at the same distance apart and constantly centered with respect to the application of the load.

2. In a bearing device, the combination with upper and lower housings or bearing-plates vertically movable the one with relation to the other and having plain bearing faces, rotatable bearing members mounted between said plates with coöperative means on said plates and rotating members to maintain the latter constantly centered beneath the point of application of the load, and to maintain said rotatable members in such position when moved out of engagement with the bearing members by the tilting of the vehicle.

3. In a bearing device, the combination with upper and lower non-connecting housings or bearing plates having plain-faced runways, a plurality of rotatable members, said rotatable members being provided with a plurality of guide members, and guide members on said upper and lower plates adapted to coöperate with the first-named guide members to maintain the rotatable members properly spaced apart to center them constantly with respect to the point of application of the load and to retain them in such centered position when moved out of engagement with the bearing-plates by the tilting of the vehicle.

4. In a bearing device, the combination with upper and lower bearing plates vertically movable the one with relation to the other and having plain bearing faces forming runways, of a pair of bearing rollers each having a plurality of lugs on the ends thereof, said runways having guide paths on the sides formed therein to control said guide members on the rollers whereby said rollers will be maintained in central position beneath the point of application of the load at all times and will be retained in such centered position when moved out of engagement with the runways by the tilting of the car.

5. In a bearing device, the combination with upper and lower bearing plates vertically movable the one with relation to the other and having plain bearing faces forming runways, a pair of rollers interposed between said runways, means on said rollers and said upper runways to maintain said rollers suspended in centered position beneath the point of application of the load when raised out of engagement with the lower runway by the tilting of the car, and means on the lower runway to guide the rollers into centered position when the runways resume their normal position.

6. In a bearing device, the combination with upper and lower bearing plates vertically movable the one with relation to the other and having plain bearing faces forming runways, of a pair of rotatable bearing members each having guide means, and guide means also on said upper and lower bearing plates whereby the rotatable members will be constantly maintained in the centered position beneath the load irrespective of the number of turns which said rotatable members may make in the operation of the vehicle.

7. In a bearing device, the combination with upper and lower bearing plates vertically movable the one with relation to the other and having plain bearing faces forming runways and each having a slot arranged in a vertical plane, a pair of bearing rollers interposed between said bearing plates, said rollers being provided at the end with one or more lugs adapted to engage said slots, said slots being so formed as not to interfere with the rotation of said rollers but to guide the same to centered position beneath the point of application of the load at all times, and also to maintain the rollers in substantially centered position when the car body is tilted and the rollers are out of engagement with one or the other of said upper and lower bearing members.

8. In a bearing device, the combination with upper and lower bearing plates vertically movable the one with relation to the other and having plain bearing faces forming runways, each runway having V-shaped slots arranged in vertical planes, a pair of rollers each having a pair of guide lugs arranged at opposite sides on the same diameter of the rollers, said lugs being adapted to engage said V-shaped slots whereby said rollers are held constantly spaced an equal distance apart or constantly maintained in substantially central position beneath the point of application of the load, and when the car body is tilted said rollers will be suspended by said lugs and slots in the upper bearing member in centered positions beneath the points of application of the load when the car is returned to horizontal position.

9. A bearing device comprising upper and lower bearing members vertically movable and longitudinally shiftable the one with relation to the other, a plurality of rollers interposed between said bearing members, and means on said bearing members and said rollers to maintain the rollers constantly spaced at the same distance apart and constantly centered with respect to the application of the load.

10. A bearing device comprising upper and lower housings or bearing plates vertically movable and longitudinally shiftable, the one with relation to the other, rotatable bearing members mounted between said plates with coöperative means on said plates and rotating members to maintain the latter constantly centered beneath the point of application of the load, and to maintain said rotatable members in such position when moved out of engagement with the bearing plates by tilting of the vehicle.

11. In a bearing device, the combination with upper and lower non-connecting housings or bearing plates, a plurality of rotatable bearing members, said rotatable members being provided with a plurality of guide members; and guide members on said upper and lower plates adapted to coöperate with said first named guide members to maintain the rotatable members properly spaced apart to center them constantly with respect to the point of application of the load and to retain them in such centered position when moved out of engagement with the bearing plates by tilting of the vehicle.

12. A bearing device comprising upper and lower bearing faces vertically movable and longitudinally shiftable one with relation to the other, a plurality of rotatable bearing members interposed between said bearing faces, and means for maintaining said bearing members constantly spaced at the same distance apart and for maintaining the true rolling relation of said bearing members with respect to said bearing faces upon vertical movement of the latter from each other.

13. A bearing device comprising upper and lower bearing members having bearing faces vertically movable and longitudinally shiftable, one with relation to the other; a rotatable bearing member interposed between said faces and having rolling engagement with each; means causing said rotatable bearing member to lift when the upper bearing face lifts; and means for maintaining rolling relations between the lower face and said rotatable bearing member during such lifting, substantially as described.

14. A bearing device comprising upper and lower bearing members having plain bearing faces vertically movable and longitudinally shiftable, one with relation to the other; a rotatable bearing member interposed between said faces and provided with plain bearing faces having rolling engagement with each; lugs on the upper side portions of said bearing member; means engaging said lugs for causing said rotatable bearing member to lift when the upper bearing face lifts; and means for maintaining rolling relations between the lower face and said rotatable bearing member during such lifting, substantially as described.

15. A bearing device comprising upper and lower bearing members having bearing faces vertically, laterally and longitudinally shiftable, one with relation to the other; a rotatable bearing member interposed between said faces and having rolling engagement with each; and positive means for maintaining true rolling relations between said bearing members during vertical, lateral and longitudinal shifting, substantially as described.

16. A bearing device comprising upper and lower bearing members having plain bearing faces vertically movable and longitudinally shiftable, one with relation to the other; a rotatable bearing member interposed between said faces and provided with plain bearing faces having rolling engagement with each; lugs on the upper side portions of said bearing member; means engaging said lugs for causing said rotatable bearing member to lift when the upper bearing face lifts; lugs on the lower side portions of said rotatable bearing member; and means engaging said lower lugs for maintaining rolling relations between the lower face and said rotatable bearing member during such lifting, substantially as described.

17. In a bearing device, the combination with upper and lower bearing housings movable longitudinally one with relation to the other and movable vertically, a bearing member interposed between said housings and adapted to have rolling engagement therewith, means for maintaining the bearing member in operative rolling position with the housings when said housings are moved longitudinally, and means co-acting with said first means for maintaining the bearing member in operative rolling position when one of said housings is moved vertically out of engagement with said bearing.

18. In a bearing device, the combination with upper and lower bearing housings movable longitudinally one with relation to the other and movable vertically and having plain bearing faces, a bearing member interposed between said faces and adapted to have rolling engagement therewith, means for maintaining the bearing member in operative rolling position with said faces when the housings move longitudinally, and means co-acting with said first means for maintaining the same relative position of the bearing with respect to its operative position with said faces when one of the housings is moved vertically out of engagement with said member.

19. In a bearing device, the combination with upper and lower bearing housings movable longitudinally one with relation to the other and movable vertically and having plain bearing faces, a bearing member interposed between said faces and adapted to have rolling engagement therewith, guiding means formed on the housings and on the bearing member for maintaining the bearing in operative rolling position with both housing faces when said housings are moved longitudinally, and guiding means coöperating with the means on the housing for maintaining the bearing in operative rolling position when one of said housings is moved vertically out of engagement with said bearing.

20. In a bearing device, the combination with upper and lower bearing housings movable longitudinally one with relation to the other and movable vertically and having plain bearing faces, a bearing member interposed between said faces and adapted to have rolling engagement therewith, guiding means formed on the housings and on the bearing member for maintaining the bearing in operative rolling engagement with both bearing faces when said housings are moved longitudinally, and means on the bearing member coöperating with the means on one of said housings for maintaining the bearing member in operative rolling position when one of said faces is moved vertically out of engagement with the bearing member.

21. In a bearing device, the combination with upper and lower bearing housings movable longitudinally one with relation to the other and movable vertically and having plain bearing faces, a bearing member interposed between said faces and adapted to have rolling engagement therewith, guiding means formed on the housings and on the bearing member for maintaining the bearing in operative rolling engagement with both bearing faces when said housings are moved longitudinally, and means on the bearing member coöperating with the means on one of said housings for suspending the bearing member and maintaining it in rolling position with respect to its operative rolling position with the bearing faces when said faces are moved vertically out of engagement with said member.

22. A bearing device comprising upper and lower bearing members having plain bearing faces, vertically movable and longitudinally shiftable, one with relation to the other; a rotatable bearing member interposed between said upper and lower bearing members and provided with plain bearing faces having rolling engagement therewith; two laterally extending lugs on the lower side portion of said rotatable member; and a guide projection on said lower bearing member engaging between the lugs on said rotatable member, substantially as described.

23. A bearing device comprising upper and lower bearing members having plain bearing faces, vertically movable and longitudinally shiftable, one with relation to the other; a rotatable bearing member interposed between said upper and lower bearing members and provided with plain bearing faces having rolling engagement therewith; two laterally extending lugs on the lower side portion of said rotatable member; and a substantially inverted V-shaped guide projection on said lower bearing member engaging between the lugs on said rotatable member, substantially as described.

24. A bearing device comprising upper and lower bearing members having plain bearing faces, vertically movable and longitudinally shiftable, one with relation to the other; a rotatable bearing member interposed between said upper and lower bearing members and provided with plain bearing faces having rolling engagement therewith; two laterally extending lugs on each lower side portion of said rotatable member; and a guide projection on said lower bearing member engaging between the lugs on each side of said rotatable member, substantially as described.

25. A bearing device comprising upper and lower bearing members having plain bearing faces, vertically movable and longitudinally shiftable, one with relation to the other; a rotatable bearing member interposed between said upper and lower bearing members and provided with plain bearing faces having rolling engagement therewith; two laterally extending lugs on each lower side portion of said rotatable member; and a substantially inverted V-shaped guide projection on said lower bearing member engaging between the lugs on each side of said rotatable member, substantially as described.

26. A bearing device comprising upper and lower bearing members having plain bearing faces, vertically movable and longitudinally shiftable, one with relation to the other; a rotatable bearing member interposed between said upper and lower bearing members and provided with plain bearing faces having rolling engagement therewith; two laterally extending lugs on the lower side portion of said rotatable member; and a substantially inverted V-shaped guide projection whose sides are slightly curved on said lower bearing member engaging between the lugs on said rotatable member, substantially as described.

27. A bearing device comprising upper and lower bearing members having bearing faces, vertically movable and longitudinally shiftable, one with relation to the other; a rotatable bearing member interposed between said upper and lower bearing members and having rolling engagement therewith; two laterally extending lugs on the lower side portion of said rotatable member; a substantially inverted V-shaped guide projection on said lower bearing member engaging between the lugs on said rotatable member; a lifting lug on the central upper portion of each side of said rotatable member; and a substantially V-shaped guideway on said upper bearing member engaging each of said lifting lugs, substantially as described.

28. A bearing device comprising upper and lower bearing members having plain bearing faces, vertically movable and longitudinally shiftable, one with relation to the other; a rotatable bearing member interposed between said upper and lower bearing members and provided with plain bearing faces having rolling engagement therewith; two laterally extending lugs on each lower side portion of said rotatable member; a guide projection on said lower bearing member engaging between the lugs on each side of said rotatable member; a lifting lug on the central upper portion of each side of said rotatable member; and a substantially V-shaped guideway on said upper bearing member engaging each of said lifting lugs, substantially as described.

29. A bearing device comprising upper and lower bearing members having plain bearing faces, vertically movable and longitudinally shiftable, one with relation to the other; a rotatable bearing member interposed between said upper and lower bearing members and provided with plain bearing faces having rolling engagement therewith; two laterally extending lugs on each lower side portion of said rotatable member; a substantially inverted V-shaped guide projection on said lower bearing member engaging between the lugs on each side of said rotatable member; a lifting lug on the central upper portion of each side of said rotatable member; and a substantially V-shaped guideway on said upper bearing member engaging each of said lifting lugs, substantially as described.

30. A bearing device comprising upper and lower bearing members having bearing faces, vertically movable and longitudinally shiftable, one with relation to the other; a rotatable bearing member interposed between said bearing members and having rolling engagement therewith; a central lifting lug on the upper central portion of each side of said rotatable bearing member; and a substantially V-shaped guideway on the upper bearing member engaging each of said lifting lugs, substantially as described.

31. A bearing device comprising upper and lower bearing members having bearing faces, vertically movable and longitudinally shiftable, one with relation to the other; a rotatable bearing member interposed between said bearing members and having rolling engagement therewith; a central lifting lug on the upper central portion of each side of said rotatable bearing member; a substantially V-shaped guideway on the upper bearing member engaging each of said lifting lugs; and means maintaining rolling relations between said rotatable and said lower bearing members when said upper and lower bearing members shift longitudinally relatively to each other, substantially as described.

32. In a bearing device, the combination with upper and lower bearing housings movable longitudinally one with relation to the other and movable vertically and having retaining walls and bearing faces extending from wall to wall, a bearing member interposed between said housings having a bearing face adapted to have rolling and load supporting engagement with the entire length of said first bearing faces, means on the housings and on the bearing member for maintaining the bearing member in operative rolling position, said bearing face having a face for limiting its rolling movement.

33. In a bearing device, the combination with upper and lower bearing housings movable longitudinally one with relation to the other and movable vertically and having side walls, end walls, and an intermediate wall, compartments formed by said walls, said compartments having a bearing face extending from wall to wall, a bearing member having segmental bearing faces adapted for rolling engagement with the entire length of said compartments bearing face, means formed on the side walls of the compartment and on the bearing member for maintaining the bearing in rolling engagement, said bearing member having a face between the segmental faces adapted to engage the end walls of the compartment.

In testimony whereof I have signed my name to this specification in the presence of two subscribing witnesses.

ELMYR A. LAUGHLIN.

Witnesses:
JOSHUA R. H. POTTS,
ARTHUR A. OLSON.